United States Patent Office 3,160,757
Patented Dec. 8, 1964

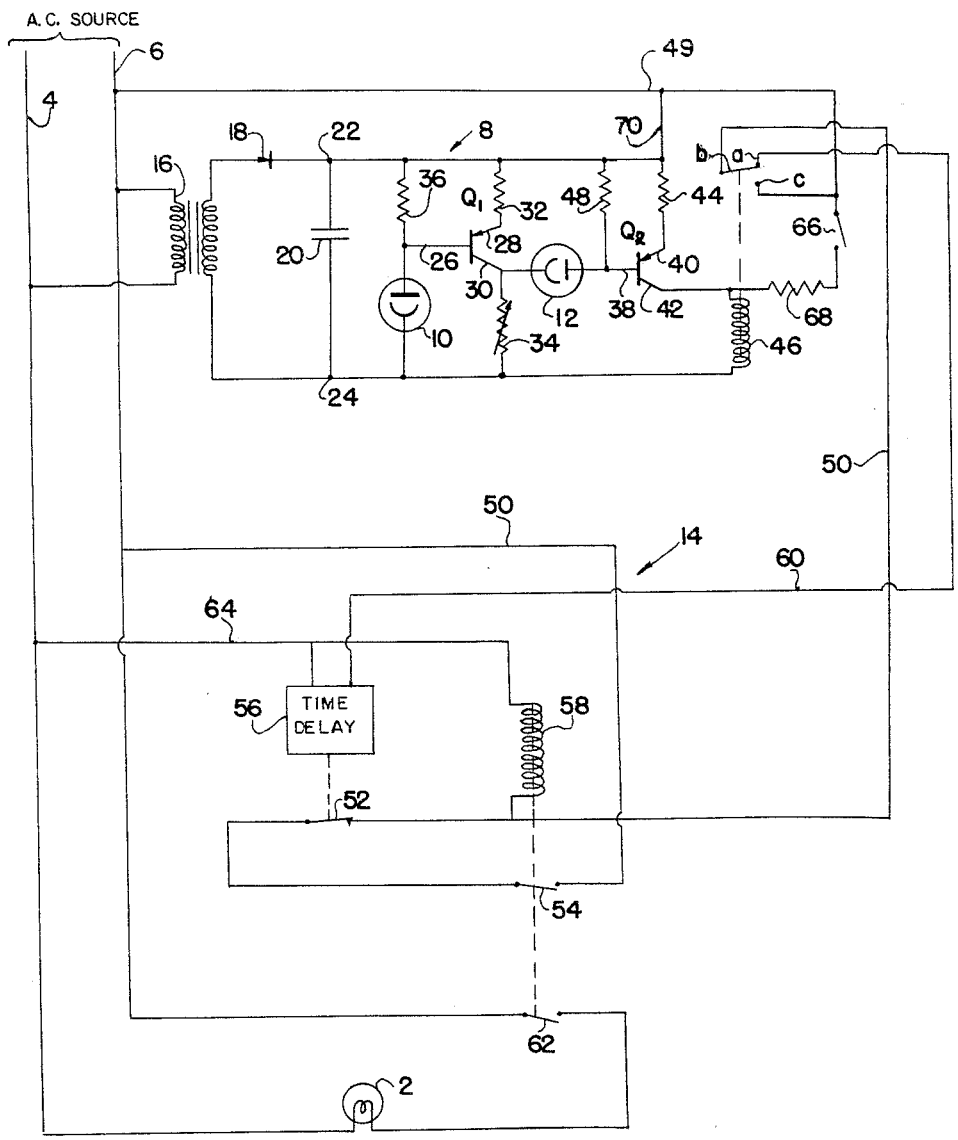

3,160,757
PHOTOELECTRIC CONTROL DEVICE RESPONSIVE
TO TWO LIGHT SOURCES
Raymond J. McAllise, 17 Crest Road, Granby, Conn.
Filed Apr. 19, 1962, Ser. No. 188,667
15 Claims. (Cl. 250—209)

This invention relates to photoelectric control devices, and relates more particularly to such a device having two photoelectric light sensors and operable to control an associated circuit or controlled device in accordance with the presence or absence of light on the sensors in a particular manner.

The control device with which this invention is concerned is a two-position controller and operates to produce one output signal when one sensor is illuminated and the other sensor not, and to produce another output signal for all other conditions of illumination or non-illumination of the two sensors. The two output signals may in turn be used to respectively energize and de-energize, or vice versa, an associated circuit or controlled device. It is contemplated that the control device be used in any application requiring the control of an external circuit or device in the manner indicated, and an example of such a use, as described in detail hereinafter, is to control the garage or other outside lights of a home. In this case one of the photoelectric sensors is positioned to be illuminated by the sunlight and the other to be illuminated by the headlamps of automobiles approaching the garage. If the sunlight sensor is illuminated the controller functions to hold the garage lights in an OFF condition regardless to the state of illumination of the headlamp sensor. If the sunlight sensor is not illuminated the controller functions to hold the garage lights in an OFF condition as long as the headlamp sensor is not illuminated and to turn the garage lights ON when the latter sensor is illuminated. Therefore, the headlamps of an automobile approaching the garage in the nighttime will cause the garage lights to be lighted. When used in this application the controller also preferably includes a time delay device for holding the garage lights ON for a predetermined time after the headlamp sensor ceases to be illuminated to allow the driver safe entry to his home after garaging the automobile. Also included may be a switch located inside the home and adapted when switched ON to maintain the garage lights on for so long as the switch remains on and operable in conjunction with the time delay device to maintain the garage lights in a lighted condition for a predetermined time after being switched OFF.

The general object of this invention is therefore to provide a photoelectric controller responsive to the illumination of two separate photoelectric sensors for controlling the operation of an external circuit or device.

Another object of this invention is to provide a controller of the foregoing character which is small in size, of simple construction and economical to operate. In keeping with this object it is a further object to provide such a controller making use of transistors which are small in size and require very little power.

Another object of this invention is to provide a photoelectric controller for garage or other outdoor lights which operates to turn on said lights upon the approach of an automobile in the nightime and to maintain said lights in an OFF condition at all times during the daytime.

A further object of this invention is to provide a controller as set forth in the preceding paragraph and including a time delay device for maintaining the garage or other outdoor lights lighted for a predetermined time after the automobile enters the garage or otherwise passes a given photoelectric sensor.

A still further object of this invention is to provide a controller as set forth above which includes a manually operable override switch for turning the controller lights ON and OFF at any time and which operates in conjunction with the time delay device to maintain the lights in an ON condition for a predetermined time after the switch is turned off. Thus, when the switch is located in the house and the controlled lights in an adjacent garage, a person leaving the house may turn the switch ON and then OFF and the garage lights will be turned on and will remain on for a sufficient length of time to permit the person to safely walk to the garage and start and remove the automobile before the lights are again turned OFF.

Other objects and advantages of the invention will be apparent from the following description and from the drawing forming a part hereof.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

The drawing is a schematic diagram of a photoelectric controller embodying the present invention and applied to the control of an external circuit containing an incandescent lamp such as a garage lamp.

Referring now to the drawing, there is shown an embodiment of the present invention which is adapted to control the energization and de-energization of an external electrical circuit including a garage light 2 connected to an A.C. source by two conductors 4 and 6. The A.C. source is preferably a source of conventional house current and may be taken to be current supplied at a frequency of 60 cycles per second and a voltage of 115 volts R.M.S. The use of alternating current is not, however, essential to the present invention and if a direct current source of house current is available the illustrated system can be operated from the direct current source by omitting the hereinafter described transformer and rectifier.

The energization of the garage light 2 is controlled by a device indicated generally at 8 and including two photosensitive cells 10 and 12. These two photosensitive cells or sensors are devices having an electrical resistance which decreases with increases in the amount of radiant energy or light striking the device and may, for example, consist of conventional gas-filled or vacuum phototubes, photosensitive semiconductors, or any other devices having resistance characteristics similar to such phototubes. The physical location of the cell 10 is such that it is exposed to the sunlight present during the daytime and the cell 12 is physically located so as to be lighted by the headlamps of automobiles which approach the garage. It is also to be understood that in the broadest aspects of this invention the photosensitive cells 10 and 12 may also comprise part of or be replaced by photosensitive transistors each of which photosensitive transistors essentially combines the functions of the cell 10 or 12 and its associated transistor $Q_1$ or $Q_2$ hereinafter described.

The control device 8 is a two-position controller in that it acts to either energize or de-energize the garage lamp 2. The operation is further such that the garage lamp is lighted or energized only when the photosensitive cell 10 is darkened as at nighttime and the photosensitive cell 10 is lighted by the headlamps of an oncoming automobile. At all other times the device 8 acts to hold the garage lamp 2 in an unenergized condition, except that an associated time delay circuit indicated generally at 14 operates to maintain the lamp energized for a predetermined length of time after the photosensitive cell 12 is returned to a darkened state.

The control device 8 includes a source of direct current voltage which in the illustrated case is provided by a transformer 16 having its primary coil connected across the A.C. source conductors 4 and 6 and its secondary coil connected with a half wave rectifying and filtering circuit including a diode rectifier 18 and a capacitor 20 which serve to provide a substantially direct current output across the condenser terminals 22 and 24. Connected across this source of direct current voltage is a first transistor switch including a first transistor $Q_1$ having base, emitter and collector electrodes 26, 28 and 30 respectively. The emitter 28 is connected to the positive or upper side of the voltage source through a fixed resistor 32 and the collector electrode 30 is connected with the negative or bottom side of the voltage source through a variable resistor 34. It will therefore be evident that the current flowing through the collector electrode will be dependent on the base current and that by regulating the base current the transistor $Q_1$ may be effectively turned ON or OFF as a switch to respectively permit and prevent the flow of collector current. Accordingly, the base electrode may be considered to be the input to the switch and the collector electrode to be the output of the switch.

The current passing through the base electrode 26 is in turn controlled by a voltage divider connected across the direct current voltage source and including a fixed resistor 36 and the first photosensitive cell 10. The base 26 is connected to the junction between the resistor 36 and the photosensitive cell 10 and the resistance of the cell 10 forms one leg of the voltage divider. When no light strikes the photosensitive cell 10 its resistance is relatively high and a positive voltage is applied to the base 26 causing a reverse bias voltage to exist between the base and collector electrodes and causing the transistor $Q_1$ to be turned OFF so that relatively little collector current will flow. When the photosensitive cell 10 is exposed to light, however, its resistance decreases and this causes the voltage applied to the base 26 to become more negative and due to the presence of the resistor 34 a forward bias voltage will be established between the base and collector electrodes with the result that the transistor $Q_1$ is turned ON and considerable collector current will flow.

Also included in the control device 8 is a second transistor switch including a second transistor $Q_2$ having base, emitter and collector electrodes 38, 40 and 42 respectively. The emitter 40 is connected to the positive side of the voltage source through a fixed resistor 44 and the collector electrode 42 is connected to the lower or negative side of the voltage source through an output impedance which in the present instance constitutes a relay coil 46. The base electrode 38 is connected to the positive or upper side of the voltage source through a fixed resistor 48 and is also connected with the collector electrode 30 of the transistor $Q_1$ through the second photosensitive cell 12. From this it will be evident that the state of the transistor $Q_2$ will be dependent on the bias voltage existing between the collector 42 and the base 38 and this in turn will be dependent on the state of conduction of the first transistor $Q_1$ and on the state of illumination of the photosensitive cell 12. Insofar as the current flowing through the base electrode 38 determines the current flowing through the collector electrode 42, the base electrode may be taken to be the input of the second switch and the collector electrode to be the output.

When the first transistor $Q_1$ is conducting, as at daytime due to the illuminated condition of the photosensitive cell 10, the collector electrode 30 becomes of positive potential due to the voltage drop across the resistor 34 caused by the flow of collector current, and accordingly the base electrode 38 of the transistor $Q_2$ will have a positive potential applied to it regardless of the state of illumination of the second photosensitive cell 12. The transistor $Q_2$ thus has a reverse bias voltage applied between its collector and base electrodes and is held in an OFF condition so that little collector current will flow. At nighttime when the first transistor $Q_1$ is turned OFF by the photosensitive cell 10 the collector electrode 30 becomes negative and the voltage applied to the base electrode 38 of the second transistor $Q_2$ will depend on the state of illumination of the second photosensitive cell 12. If the cell 12 is not illuminated its resistance is high and the voltage applied to the base will remain generally positive so that the transistor $Q_2$ is retained in an OFF condition. When however, the photosensitive cell 12 is illuminated, its resistance decreases and this in turn makes the base electrode 38 more negative and turns the transistor $Q_2$ ON. As the said transistor is turned ON collector current flows through the collector 42 and energizes the output coil 46. The coil 46 remains energized for as long as the cell 12 is illuminated, and as soon as said cell is returned to a darkened state the voltage on the base electrode 38 is again increased and the transistor turned OFF to de-energize the coil 46.

From inspection of the circuit diagram it will also be noted that the value of the resistance 34 has some bearing on the operation of both of the photosensitive cells 10 and 12. By adjusting this resistor the sensitivity of the circuit to light may be varied to produce the most satisfactory type of operation.

The energization and de-energization of the relay coil 46 is used to control the energization of the garage lamp 2 through the time delay circuit indicated at 14. Associated with the relay coil 46 are three contacts *a*, *b* and *c*, the contacts *a* and *b* being normally closed and the contacts *b* and *c* being normally open. The contact *c* is connected by a line 49 to the source conductor 6 and the contact *b* is connected to the same source conductor 6 by an alternate line 50 containing a normally closed switch 52 and a normally open switch 54. The operation of the first switch 52 is controlled by a time delay device 56 and the second switch is controlled by a relay 58. The contact *a* of the relay 46 is connected by a line 60 to one side of the time delay device 56. The relay 58 also has associated therewith a second normally open switch 62 which is located in series with the garage lamp 2 so as to control its energization and de-energization. The coil of the relay 58 is connected at one side to the line 50 as shown and has its other side connected to the line 64 and through said line to the A.C. source conductor 4. The time delay device is or may be of conventional construction and is of the type which operates to normally hold the associated switch 52 in a closed condition. The device 56 is normally de-energized and when energized acts to retain the switch 52 in a closed condition throughout a predetermined delay period following the instant of energization. After the running of this delay period, the switch 52 is momentarily opened and then reclosed. Devices of this type are well known in the art, and the device 56 is further preferably of the type including provision for readily adjusting the length of the delay period. In the usual case a delay period of about three minutes is satisfactory.

The operation of the time delay circuit 14 associated with the control device 8 may be best considered by starting with the normal conditions of the two devices, these conditions being shown in the drawing. Assume now that the relay coil 46 is energized as a result of a darkened condition of the photosensitive cell 10 and an illuminated condition of the photosensitive cell 12. As a result of this the associated contacts *b* and *c* are closed and the contacts *a* and *b* are opened. Closing of the contacts *b* and *c* energizes the relay coil 58 by completing a circuit from the source conductor 4 through the line 64, the coil 58, the line 50 and the line 49 to the source conductor 6. This energization of the coil 58 in turn closes the switches 54 and 62, and as soon as the switch 62 is closed the garage lamp 2 is energizes. Closing of the switch 54 completes a holding circuit to the relay coil 58 through the line 50 and to the source conductor 6 so that the relay coil 58 will remain energized, and the garage lamp remains lighted, after the contacts b and c of the relay 46 are again opened.

When the illumination is removed from the second photosensitive cell 12 the contacts b and c open and the contacts a and b close. As mentioned, opening of the contacts b and c does not cause de-energization of the relay coil 58 because of the holding circuit completed by the closed switch 54. Closing of the contacts a and b, however, causes the time delay device 56 to be now energized as a result of the switch 54 being closed. This energization of the time delay device starts the running of its timing cycle and when the device times out the device operates to momentarily open and then reclose the switch 52. When the switch 52 is opened it breaks the circuit to the coil 58 and causes the latter to be de-energized, and as a result of this de-energization the switches 54 and 62 are returned to their open condition. Opening of the switch 62 de-energizes or turns OFF the garage lamp 2 while opening of the switch 54 breaks the holding circuit to the coil 58 and prevents the latter from being re-energized when the time delay switch 52 recloses. Therefore, after the time delay resets itself by closing the switch 52 the various parts of the circuit shown in the drawing are returned to their initial or normal conditions and the circuit is ready for another cycle of operation.

The circuit shown in the drawing also preferably includes a manual switch for overriding the operation of the controller 8 and for turning the garage lamp 2 ON and OFF through the time delay circuit so as to take advantage of its operation. A suitable switch may be incorporated into the circuit in many ways, and in the illustrated case comprises a switch 66 connected at one side to the line 49 and connected at its other side to the upper or positive side of the relay coil 46 through a dropping resistor 68. The line 49 is in turn connected to the negative side of the diode 18 through the line 70. The lines 70 and 49, switch 66 and resistor 68 comprise a circuit alternate to the resistor 44 and transistor $Q_2$ for applying a negative voltage to the upper end of the coil 46. The fact that an A.C. potential is applied to the control circuit through the line 70 and switch 66 has no effect on the control circuit since the other side of the A.C. source is isolated from the control circuit by the transformer, and therefore only direct current flows through the coil 46 when the switch 66 is closed. When the switch 66 is closed or turned ON the coil 46 is energized and when it is opened or turned OFF the coil is de-energized, assuming non-energization by the controller 8. Therefore, turning the switch 66 ON operates the time delay circuit to turn ON the garage lamp. Turning the switch OFF initiates the time delay cycle so that the garage lamp is thereafter turned OFF after a predetermined length of time. The switch 66 is conveniently located within the adjacent house. Thus, when leaving the house a person may turn the switch ON and then back OFF and the garage lamp 2 will light and remain lighted for a given period of time sufficient to make safe exit. Under other circumstances when it is desirable to maintain the garage lamp lighted for a long time the switch 66 may be turned ON and left in such condition and the garage lamp will remain ON until the switch is later turned OFF.

The invention claimed is:

1. A photoelectric controller comprising a photosensitive device including an electron flow control element having an output terminal and also including means separate from said electron flow control element and responsive to illumination from a first light source for controlling said electron flow control element to produce a first output signal at said output terminal when said illumination exceeds a predetermined value and to produce a second output signal when said illumination is less than said predetermined value, and a photosensitive switch circuit having an input terminal connected to said output terminal of said electron flow control element which switch circuit includes a second output terminal, a second electron flow control device and means responsive to illumination from a second light source and also to said output signals appearing at said first mentioned output terminal for controlling said second electron flow control element to produce a given output signal at said second output terminal only when said second output signal is present and when at the same time said illumination from said second light source exceeds a predetermined value.

2. A photoelectric controller comprising a first transistor switch having an output and an input, means connected with said input and including a first photosensitive sensor arranged to be illuminated by a first light source and effective to hold said transistor switch in an OFF condition when a small amount of light is radiated thereon and in an ON condition when a relatively greater amount of light is radiated thereon, a second transistor switch having an input and an output, and means connecting the output of said first transistor switch with the input of said second transistor switch and including a second photosensitive sensor arranged to be illuminated by a second light source, said second photosensitive sensor being effective when a small amount of light is radiated thereon to hold said second transistor switch in an OFF condition and to hold said same switch in an ON condition when a relatively greater amount of light is radiated thereon provided said first transistor switch is in an OFF condition.

3. A photoelectric controller as defined in claim 2 further characterized by means for manually adjusting the effectiveness of said second photosensitive sensor on said second transistor switch to thereby vary the amount of light required to be radiated upon said second sensor to hold said latter switch in an ON condition.

4. A photoelectric controller as defined in claim 2 further characterized by an external circuit, and means connected with the output of said second transistor switch for controlling the energization and de-energization of said external circuit in response to the ON or OFF condition of said second transistor switch.

5. A photoelectric controller as defined in claim 2 further characterized by an external circuit, means connected with the output of said second transistor switch for energizing said external circuit when said second switch is in an ON condition and for de-energizing said external circuit when said second switch is in an OFF condition, and a time delay device for maintaining the energization of said external circuit for a predetermined time after said second transistor switch is switched from an ON to an OFF condition.

6. A photoelectric controller as defined in claim 5 further characterized by means including a manually operable switch for overriding the operation of said second transistor switch and controlling the energization and de-energization of said external circuit in response to the ON and OFF condition of said manually operable switch.

7. A photoelectric controller as defined in claim 6 further characterized by said means connected with the output of said second transistor switch for controlling the energization and de-energization of said external circuit comprising a relay having its coil connected to the output of said second transistor switch, and said manually operable switch also having an output connected to said relay coil so that said coil may be energized by either said second transistor switch or by said manually operable switch.

8. A photoelectric controller comprising a source of substantially direct current voltage, a first transistor having first, second and third electrodes, means connecting said second and third electrodes in series across said voltage source, a voltage divider connected across said voltage source and which voltage divider includes a photosensitive sensor and is connected at one point to said first electrode, a second transistor having first, second and third electrodes, means connecting said second and third electrodes of said second transistor in series across said voltage source, and means including a second photosensitive sensor connecting one of said second and third electrodes of said first transistor to the first electrode of said second transistor.

9. A photoelectric controller comprising a source of substantially direct current voltage, a first transistor having base, emitter and collector electrodes, means connecting said emitter electrode to one side of said voltage source and a resistor connected between said collector electrode and the other side of said voltage source, a voltage divider including a resistor and a photosensitive sensor connected in series across said voltage source, means connecting said base electrode to the junction of said latter resistor and said photosensitive sensor, a second transistor having base, emitter and collector electrodes, means connecting said emitter electrode to one side of said voltage source and an output impedance connected between said collector electrode and the other side of said voltage source, and means including a second photosensitive sensor connected between the collector electrode of said first transistor and the base electrode of said second transistor.

10. A photoelectric controller as defined in claim 9 further characterized by said resistor connected between the collector terminal of said first transistor and said other side of said voltage source being manually adjustable.

11. A photoelectric controller as defined in claim 9 further characterized by a resistor connected between said base electrode of said second transistor and said one side of said voltage source.

12. A photoelectric controller as defined in claim 11 further characterized by said means connecting said emitter electrode of said first transistor to said one side of said voltage source and said means connecting said emitter electrode of said second transistor to said one side of said voltage source each including a resistor.

13. A photoelectric controller as defined in claim 9 further characterized by said output impedance comprising the coil of a relay having contacts adapted to control the energization and de-energization of an external circuit in response to the energization and de-energization of said coil.

14. A photoelectric controller as defined in claim 13 further characterized by means including a manually operable switch connected with said coil for separately energizing said coil in response to an ON condition of said latter switch.

15. A photoelectric controller as defined in claim 13 further characterized by means including a time delay device connected with the contacts of said relay for controlling the energization of an external circuit.

References Cited in the file of this patent
UNITED STATES PATENTS

| | | |
|---|---|---|
| 1,721,216 | Hardy et al. | July 16, 1929 |
| 2,959,709 | Vanaman et al. | Nov. 8, 1960 |
| 2,971,134 | Cockrell | Feb. 7, 1961 |
| 3,076,897 | Skirvin | Feb. 5, 1963 |
| 3,083,300 | Isaksen | Mar. 26, 1963 |